(12) United States Patent
Liland

(10) Patent No.: US 12,246,927 B1
(45) Date of Patent: Mar. 11, 2025

(54) REPLACEMENT BLADES FOR BELT CLEANERS AND SYSTEMS COMPRISING SAME

(71) Applicant: David K. Liland, New Bern, NC (US)

(72) Inventor: David K. Liland, New Bern, NC (US)

( * ) Notice: Subject to any disclaimer, the term of this patent is extended or adjusted under 35 U.S.C. 154(b) by 0 days.

(21) Appl. No.: 18/924,595

(22) Filed: Oct. 23, 2024

(51) Int. Cl.
*B65G 45/12* (2006.01)

(52) U.S. Cl.
CPC .................... *B65G 45/12* (2013.01)

(58) Field of Classification Search
None
See application file for complete search history.

(56) References Cited

U.S. PATENT DOCUMENTS

| | | | | |
|---|---|---|---|---|
| 7,051,862 B1 * | 5/2006 | Smith | ..................... | B65G 45/16 198/497 |
| 7,367,443 B2 * | 5/2008 | Swinderman | .......... | B65G 45/16 198/497 |
| 8,061,508 B2 * | 11/2011 | Metzner | ................. | B65G 45/12 198/497 |
| 8,267,239 B2 | 9/2012 | Swinderman | | |
| 8,485,344 B1 | 7/2013 | Liland | | |
| 8,875,870 B2 * | 11/2014 | Waters | ................... | B65G 45/16 198/497 |
| 9,586,765 B2 * | 3/2017 | Krosschell | ............. | B65G 45/16 |
| 11,225,383 B2 * | 1/2022 | Schwarze | ............. | B65G 45/16 |
| 11,840,407 B2 * | 12/2023 | Snow | ..................... | B65G 45/16 |
| 12,037,202 B2 * | 7/2024 | Hutton | ................... | B65G 45/12 |

OTHER PUBLICATIONS

American Eagle Manufacturing LLC: "Blade Edge Technology Primary and Secondary Replacement Blades", 2019, 20 pages.

* cited by examiner

*Primary Examiner* — Kavel Singh
(74) *Attorney, Agent, or Firm* — NK Patent Law

(57) ABSTRACT

Replacement cleaning blades offering flexibility to be installed onto a variety of differently configured conveyor belt cleaning systems. The replacement cleaning blades are suitable for mounting frames having varied through-hole patterns as well as mounting frames that are devoid of any attachment through-holes.

26 Claims, 8 Drawing Sheets

REPLACEMENT BLADES FOR BELT CLEANERS AND SYSTEMS COMPRISING SAME

TECHNICAL FIELD

The present disclosure generally relates to replacement scraper blades for cleaning material from a conveyor belt and to belt cleaning systems comprising the same.

BACKGROUND

Conveyor belt systems are utilized for transporting aggregate materials (for example, gravel) from one location to another. Cleaning systems have been created to scrape adherent material from the belt and thereby clean the belt. The cleaning systems generally include a mounting frame, typically in the form of a bar or pipe, to which a replaceable cleaning blade is affixed. A tensioning device can be incorporated to help maintain a desired force of the cleaning blade against the belt to drive cleaning efficiency while managing excessive wear of the blade and/or belt material.

Exemplary prior art mounting frame 10 and replaceable cleaning blade 20 are shown in FIG. 1. Mounting frame 10 includes a projection 12 that comprises a plurality of through-holes 14. Replaceable cleaning blade 20 is affixed to mounting frame 10 via a dowel 15 and clevis or wire lock pin 16, both of which reside within slot 22 in cleaning blade 20 and through-holes 14 in mounting frame projection 12. There are multiple manufacturers of cleaning systems in the industry, and many of them use their own unique mounting frame configuration with varying through-hole affixment patterns. Even for a given mounting frame hole pattern configuration, the mounting frames often have different projection thickness options that require different replacement cleaning blades to properly fit onto the same. The uniqueness in the different mounting frame characteristics creates undue complexity for the manufacture of replacement cleaning blades. Another problem that can arise with the use of dowels, snap-pins and other fasteners that are utilized with through-hole installation is that "play" or "sloppiness" can occur simply due to the tolerances with such an affixment approach. This play or sloppiness can result in less than favorable belt cleaning, part wear, and/or noise.

A need exists for a replacement cleaning blade that is capable of installation onto a variety of different mounting frame configurations—that is, a replacement cleaning blade having a more universal type fit with mounting frames and cleaning systems made by multiple different manufacturers that have different attachment requirements. The inventor has discovered an elegant solution, described below, to address this need.

SUMMARY

Improved replacement cleaning blades are provided herein. In one form, the replacement cleaning blade comprises a blade body that includes a base region and a distal cleaning edge. An insert is disposed within the base region. The insert has spaced apart first and second walls to define a channel capable of engaging a mounting frame projection. A hole configured for receiving a fastener extends through a first side of the base region and the first insert wall. The portion of the wall extending through the first insert wall comprises an internal thread. The replacement cleaning blade is capable of installation onto at least two different style mounting frames, wherein the mounting frames can have a different number or position of affixment through-holes, and/or projections of varying thickness.

In another form, the replacement cleaning blade comprises a blade body that includes a base region and a distal cleaning edge. An insert is disposed within the base region. The insert has spaced apart first and second walls to define a channel capable of engaging a mounting frame projection. A fastener extends through the first insert wall and is configured to press against a first side of a mounting frame projection to affix the replacement cleaning blade to the mounting frame projection. The second insert wall presses against a second side of the mounting frame projection so that there is no need for a fastener to extend through the second insert wall to effectuate a secure installation of the replacement cleaning blade to the mounting frame.

In yet another form, the replacement cleaning blade comprises a blade body that includes a base region and a distal cleaning edge. The base region comprises a channel capable of engaging a mounting frame projection. Positioned on at least one side of the channel there is a layer of urethane material and an adjacent layer of metal. A hole configured for receiving a fastener extends through both the layer of urethane material and the layer of metal. A portion of the hole extending through the layer of metal comprises an internal thread. The replacement cleaning blade is capable of installation onto at least two different style mounting frames, wherein the mounting frames can have a different number or position of affixment through-holes, and/or projections of varying thickness.

Cleaning systems are also provided herein that include a mounting frame having a projection that is devoid of any through-holes and one of the replacement cleaning blade embodiments described above affixed to the mounting frame projection.

BRIEF DESCRIPTION OF THE DRAWINGS

The above-mentioned and other features and advantages of the present disclosure, and the manner of attaining them, will become more apparent and the disclosure itself will be better understood by reference to the following description of example forms of the disclosure taken in conjunction with the accompanying drawings, wherein.

DETAILED DESCRIPTION

Reference within the specification to "form(s)", "aspect(s)", "embodiment(s)" or the like means that a particular material, feature, structure and/or characteristic described in connection with the form/aspect/embodiment is included in at least one form/aspect/embodiment, optionally a number of forms/aspects/embodiments, but it does not mean that all forms/aspects/embodiments incorporate the material, feature, structure, and/or characteristic described. Furthermore, materials, features, structures and/or characteristics may be combined in any suitable manner across different forms/aspects/embodiments, and materials, features, structures and/or characteristics may be omitted or substituted from what is described. Thus, forms/aspects/embodiments described herein may comprise or be combinable with elements or components of other forms/aspects/embodiments despite not being expressly exemplified in combination, unless otherwise stated or an incompatibility is stated.

Figure 1:
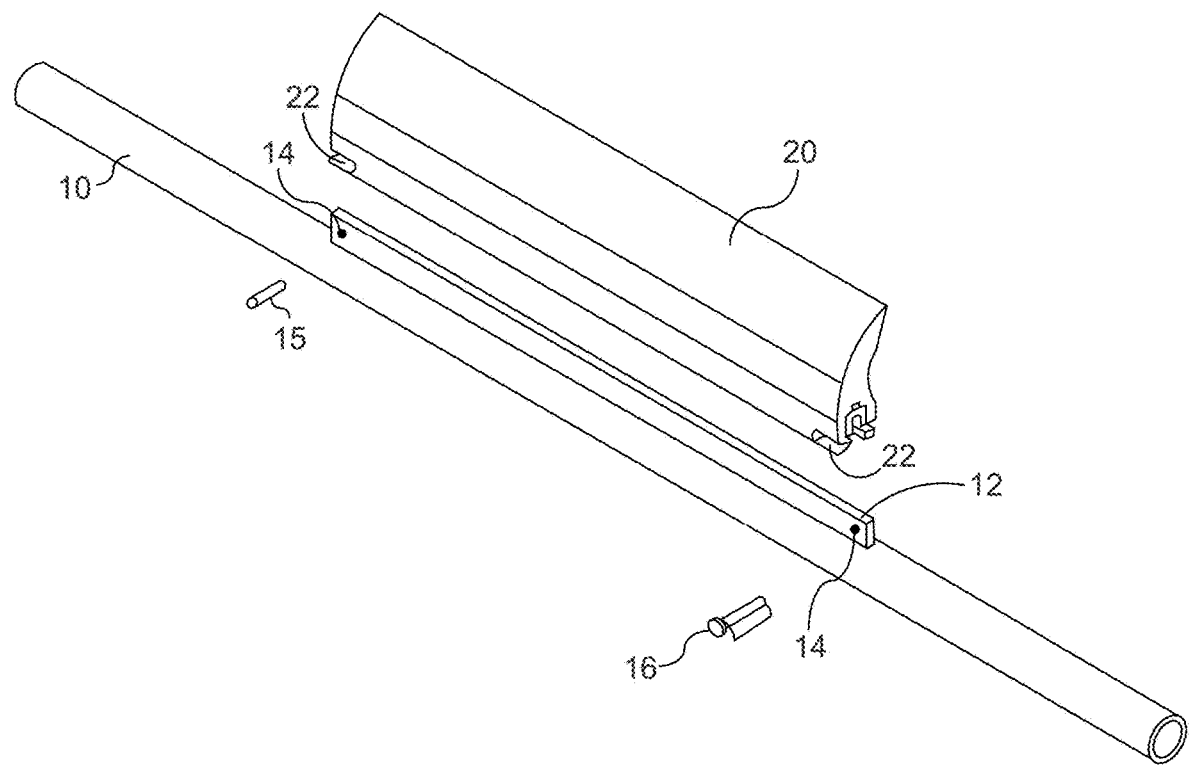
FIG. 1 is a perspective view of a partial prior art cleaning system that includes a mounting frame and a replaceable cleaning blade that is designed especially for that frame.
Figure 2:
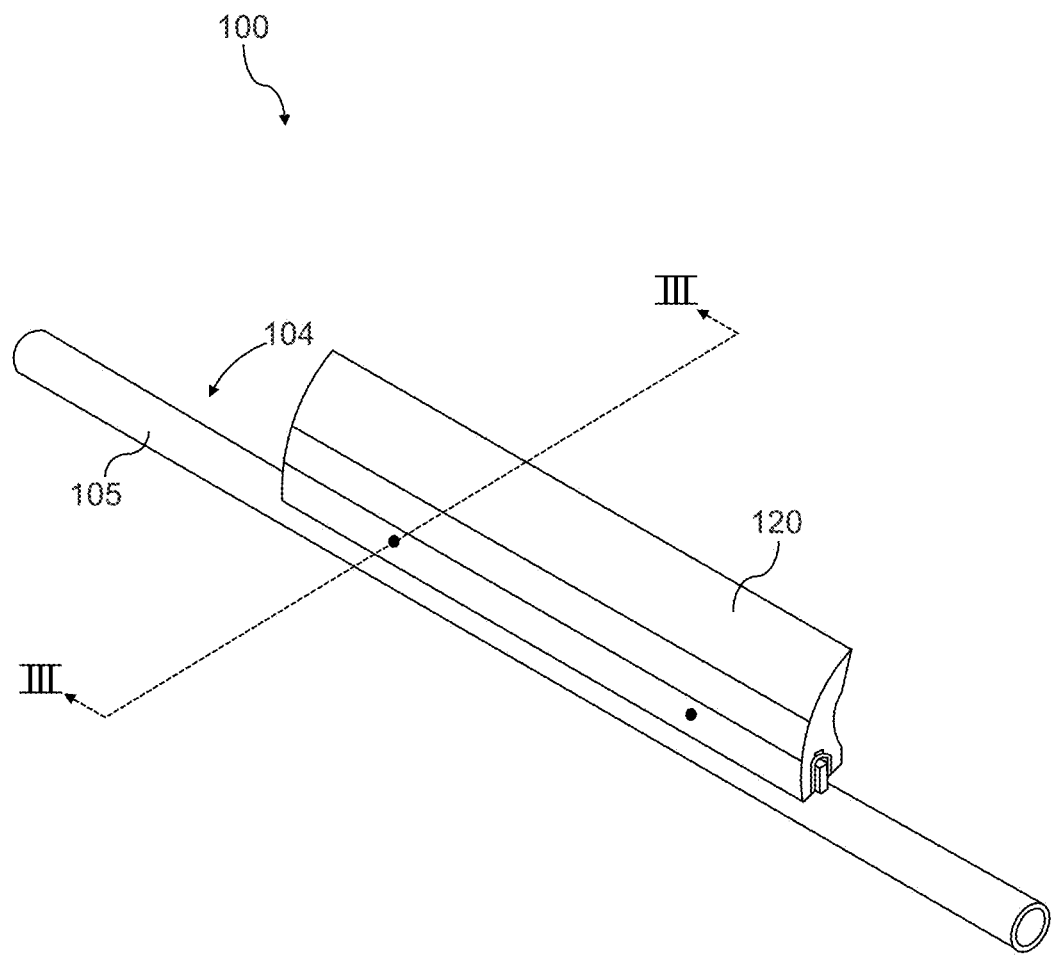
FIG. 2 is a perspective view of improved cleaning system components provided herein.
Figure 3:
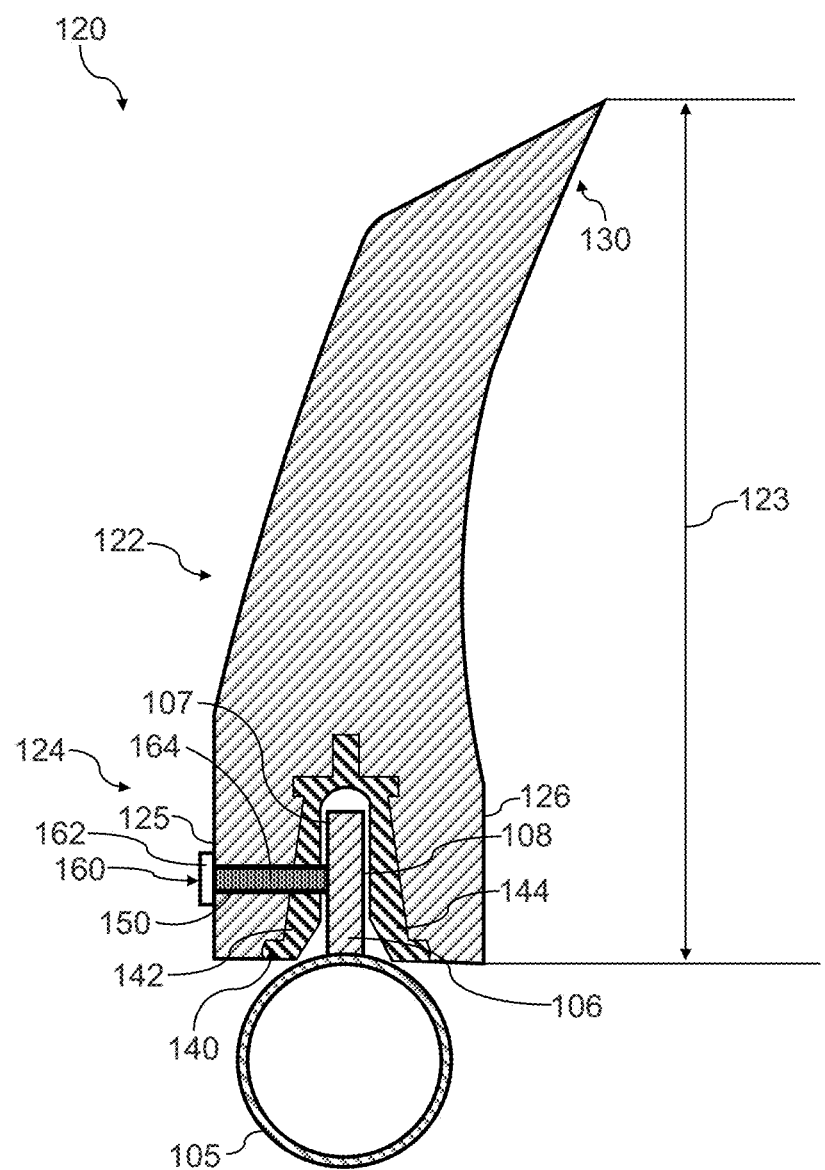
FIG. 3 is a cross-sectional view taken through line III-III in FIG. 2.

Improved replacement cleaning blades and cleaning systems comprising the same are provided. FIGS. 2 and 3 show an exemplary cleaning system 100 comprising a mounting frame 104 in form of a pipe 105, and a replacement cleaning blade 120. Mounting frame 104 has a projection 106 onto which a replacement cleaning blade 120 is affixed. Mounting frame 104 is typically made from a metal material, including, for example, steel and aluminium. Projection 106 can be bar stock that is welded onto pipe 105. Mounting frame 104 can optionally be painted or powder-coated.

Referring now to FIG. 3, replacement cleaning blade 120 includes a blade body 122 having a base region 124 and distal cleaning edge 130. Cleaning blade 120 has a length 123 that typically varies from about three inches to about 15 inches; although, other lengths are contemplated herein. Base region 124 has a first side 125 and an opposing second side 126. An insert 140 is disposed in base region 124, and comprises a first insert wall 142, a second insert wall 144, and a channel 146 therebetween for engaging a mounting frame projection. In one form, blade body 122 comprises a polymeric or elastomeric material, preferably a urethane, and insert 140 comprises a metal material. The polymeric or elastomeric material is molded or cast to envelope and contain the insert.

Base region 124 includes a hole 150 configured for receiving a fastener. Hole 150 extends through base region first side 125 and first insert wall 142. The portion of hole 150 that exists within first insert wall 142 includes an internal thread. In one form, the portion of hole 150 that exists within the base region first side 125 also comprises an internal thread. The internal threading enables solid attachment of replacement cleaning blade 120 onto mounting frame projection 106 and helps to minimize loosening of an inserted fastener without the need for a nut or other additional hardware. With this said, a washer or other component or material (for example, a thread locking adhesive) can be included to mitigate fastener loosening.

FIG. 3 shows a fastener 160 in the form of a screw extending through first side 125 and first insert wall 142, and pressing against (that is, applying a normal force to) a first side 107 of mounting frame projection 106. As illustrated in the figures, the replacement cleaning blades are installed onto a mounting frame from only one side. With this approach, secure attachment is aided by the second insert wall 144 pressing against a second side 108 of mounting frame projection 106. It can be advantageous to install the replacement blade onto the mounting frame from only one side due to the positioning of the mounting frame and associated conveyor belt structure located around the mounting frame. However, including similar holes and fasteners to those shown in FIGS. 2 and 3 on the second side 126 of the replacement cleaning blade is possible, with the same being either aligned with or offset from the holes and fasteners on the first side 125.

Fastener 160 is shown having a driving head 162 and threaded shank 164. Suitable driving heads include, but are not limited to, external square, external hex, square socket, hex socket, and slot. Threading can start within about 0.25 inch or closer to the drive head and extend down shank 164. The fastener can alternatively be headless; that is, in the form of a set screw or the like. When a screw is used as the fastener, the screw can have a variety of different point styles, including, for example, cup point, cone point, domed point, flat point, extended point, and knurled cup point.

Figure 4A:
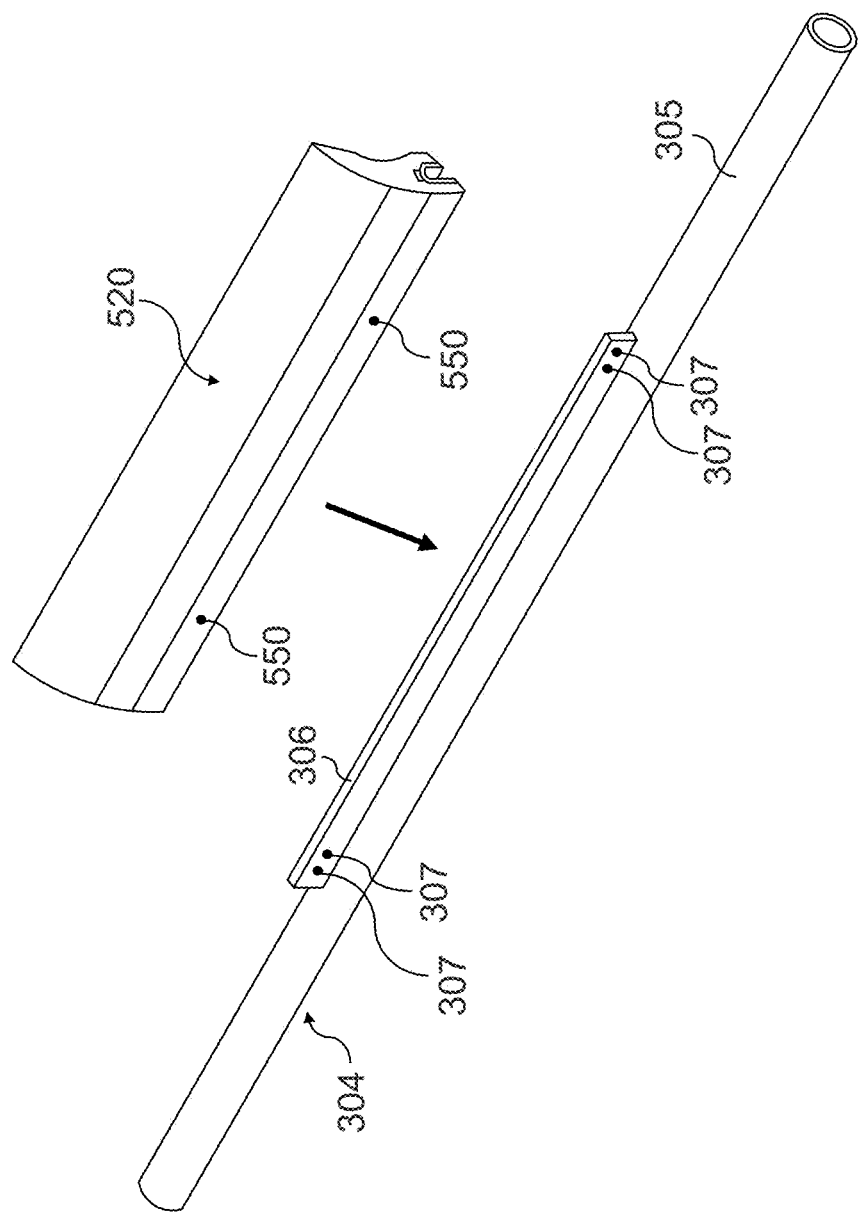
FIGS. 4A and 4B are perspective views of different configured mounting frames onto which replacement cleaning blades of the present invention can be installed.
Figure 4B:
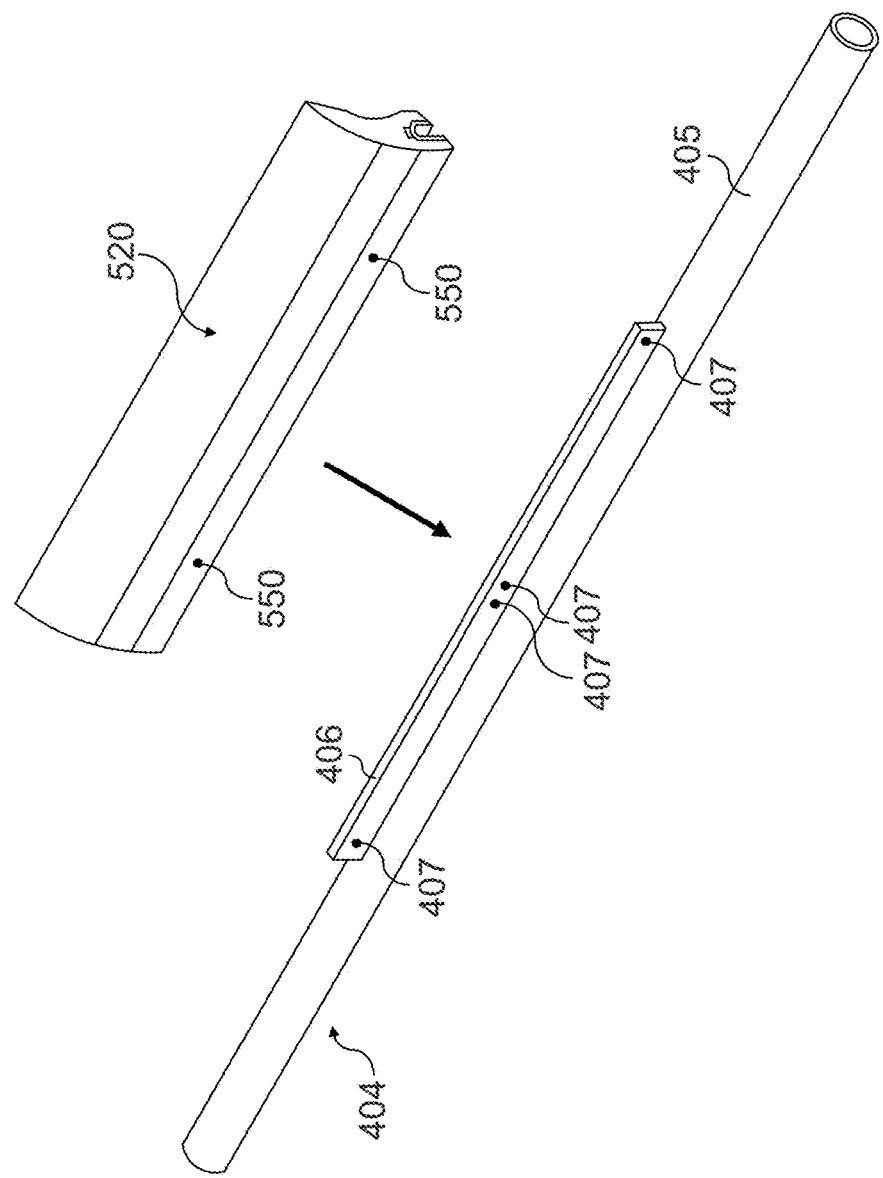
Figure 5:
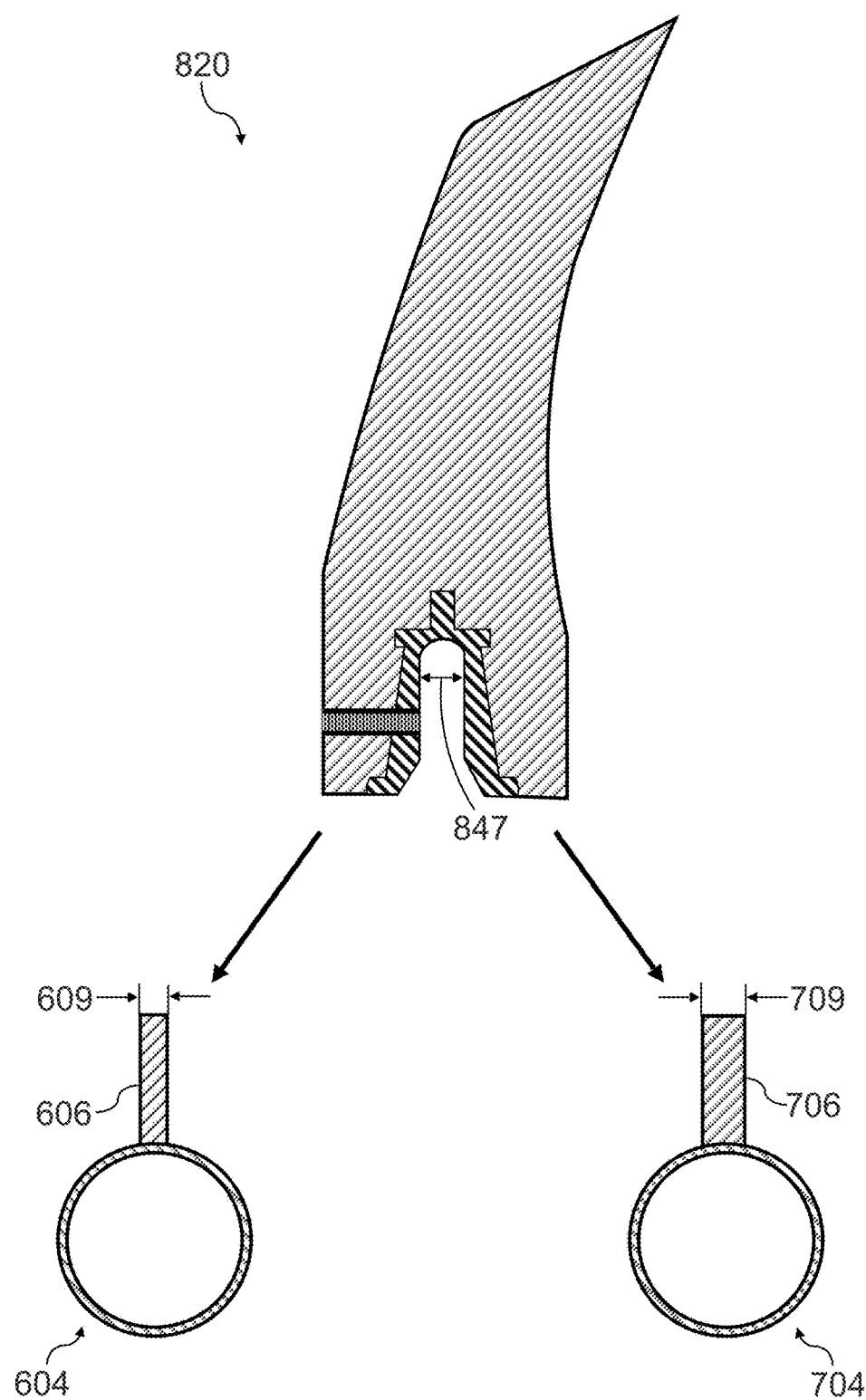
FIG. 5 is a cross-sectional view of different configured mounting frames onto which replacement cleaning blades of the present invention can be installed.

As noted in the Background Section above, there are many different manufacturers of belt cleaning systems, and each manufacturer typically employs a different configured mounting frame attachment scheme. The improved replacement cleaning blades provided herein offer the benefit of being capable of installation onto the different configurations, thereby dramatically reducing the complexity of manufacturing and supplying replacement cleaning blades. FIGS. 4A, 4B, and 5 illustrate examples of this point.

FIG. 4A shows a mounting frame 304 that includes a pipe 305 and projection 306 that has an OEM attachment hole pattern of two adjacent through-holes 307 at each end of projection 306. FIG. 4B similarly shows a mounting frame 404 that includes a pipe 405 and projection 406 that has an OEM attachment hole pattern of two through-holes 407 in the middle of projection 406 and a single through-hole 407 on each end of the projection. Advantageously, the replacement cleaning blades of the present invention can be installed onto the mounting frame configuration shown in FIG. 4A and equally onto the mounting frame configuration shown in FIG. 4B. Replacement cleaning blade 520, as embodied in FIGS. 4A and 4B, includes two fastener-receiving holes 550 that are positioned such that they will be offset from the OEM through-holes 307/407. However, the fastener-receiving holes 550 need not be offset from the OEM through-holes 307/407 so long as the through-holes do not have a diameter larger than that of a fastener disposed within holes 550. Cleaning systems provided herein can include a mounting frame that has a projection devoid of any through-holes. This can offer a variety of advantages, including, for example, being able to completely powder-coat the mounting frame hardware because powder-coating small diameter through-holes can be challenging at best.

Figure 6:
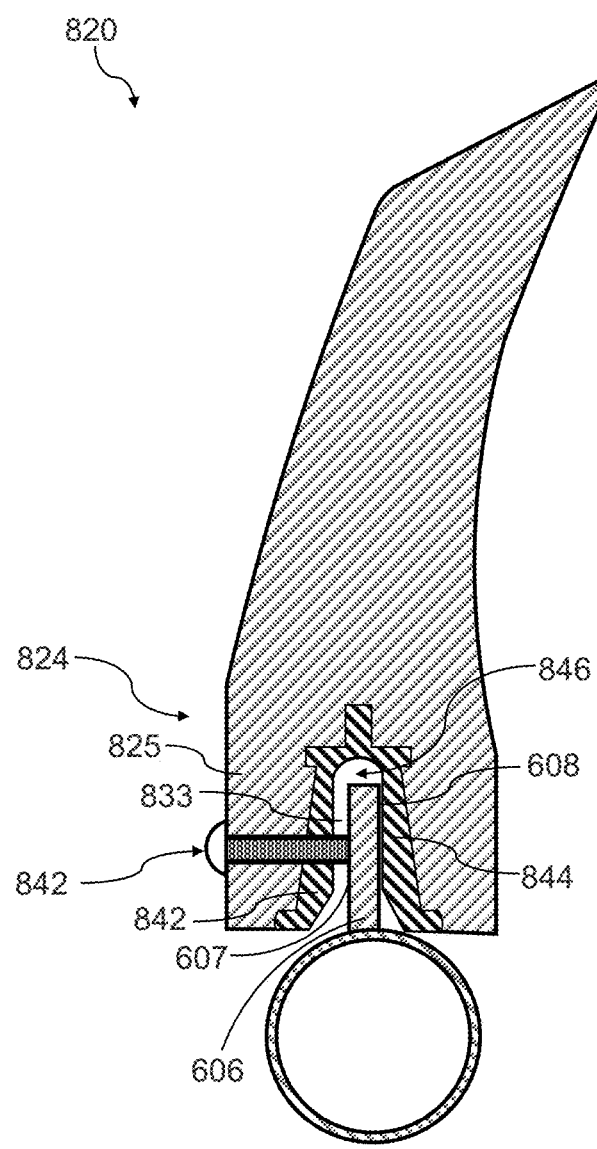
FIG. 6 is cross-sectional view of an exemplary replacement cleaning blade affixed to a mounting frame.

In addition to varying through-hole patterns, OEM mounting frames can have a projection with different widths or thicknesses. FIG. 5 shows a first mounting frame variation 604 that includes a projection 606 of a first thickness 609 and a second mounting frame variation 704 that includes a projection 706 with a second thickness 709 that is greater than first thickness 609. Typical industry standard mounting frame projection thicknesses can be ⅜, ½, or ¾ inch. Advantageously, a replacement cleaning blade 820 of the present invention having an insert channel width 847 can be installed onto different thickness mounting frame projections without concern for too much play or sloppiness. FIG. 6 illustrates why. Fastener 860 extends through a first side 825 of the blade body base region 824 and a first insert wall 842, and presses against a first side 607 of mounting frame projection 606. Second insert wall 844 provides the support for the second side 608 of the projection. And while a gap 833 exists within insert channel 846, replacement cleaning blade 820 can be successfully affixed to mounting frame projection 606. The flexible replacement cleaning blades provided herein can accommodate such gaps in a range from about 0.1 inch to about 0.5 inch, or even larger.

Figure 7:
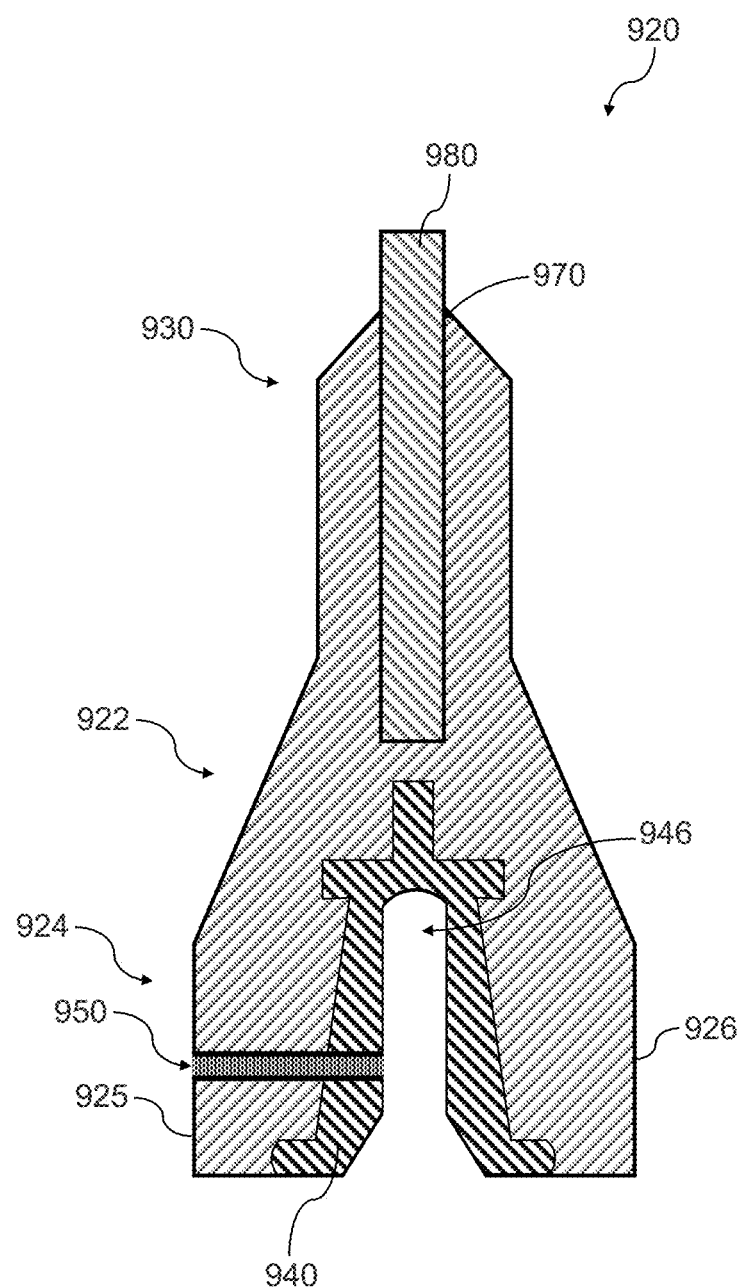
FIG. 7 is a cross-sectional view of another replacement cleaning blade embodiment provided herein.

FIG. 7 shows another replacement cleaning blade embodiment. Replacement cleaning blade 920 comprises a blade body 922 having a base region 924 and distal cleaning region 930. Base region 924 has a first side 925 and an opposing second side 926. An insert 940 is disposed in base region 924, and comprises a first insert wall 942, a second insert wall 944, and a channel 946 therebetween for engaging a mounting frame projection. Base region 924 includes a hole 950 configured for receiving a fastener. Hole 950 extends through base region first side 925 and first insert wall 942. The portion of hole 950 includes an internal thread. Replacement cleaning blade 920 includes a slot 970 for retaining a replaceable cleaning tip 980. For simplicity, fasteners for securing cleaning tip 980 are not shown in FIG. 7. The cleaning tip can be made from various materials depending on the cleaning need, with one example being carbide.

The drawings and description have focused on a general cleaning blade configuration that includes a polymeric/elastomeric body with a metal insert that defines the channel for engaging a mounting frame projection. However, other cleaning blade configurations are possible, including, for example, wherein the polymeric/elastomeric blade body is molded with a channel for engaging a mounting frame projection. A metal layer in the form of a metal strip or the like can be disposed on at least one side of the channel, wherein the metal layer comprises a threaded hole for receiving a fastener. Thus, various material combinations and arrangements can exist going from one side of a cleaning blade base region to the opposite side of the cleaning blade base region (different layers of materials separated by a dash): polymer/elastomer-metal-metal-polymer/elastomer, polymer/elastomer-metal-polymer/elastomer, metal-polymer/elastomer-metal, metal-polymer/elastomer, for example.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present disclosure have been illustrated and described, it would be understood by those skilled in the art that various other changes and modifications can be made without departing from the spirit and scope of the present disclosure. It is therefore intended to cover in the appended claims all such changes and modifications that are within the scope of the present disclosure.

What is claimed is:

1. A replacement cleaning blade for installation onto a belt cleaning mounting frame comprising a projection, the replacement cleaning blade comprising:
   a blade body comprising a base region and a distal cleaning edge;
   an insert disposed within the base region, the insert comprising a first insert wall and a spaced apart second insert wall defining a channel therebetween for engaging a mounting frame projection; and
   a hole configured for receiving a fastener and extending through a first side of the base region and the first insert wall;
   wherein a portion of the hole extending through the first insert wall comprises an internal thread; and
   wherein the replacement cleaning blade is capable of installation onto at least two different configured mounting frames, the configuration difference comprising at least one of:
      number of through-holes disposed in the mounting frame projection;
      position of through-holes disposed in the mounting frame projection; and
      thickness of the mounting frame projection that engages the channel.

2. The replacement cleaning blade of claim 1, wherein the blade body comprises a urethane material.

3. The replacement cleaning blade of claim 1, wherein the insert comprises a metal.

4. The replacement cleaning blade of claim 1, wherein a portion of the hole extending through the first side of the base region also comprises an internal thread.

5. The replacement cleaning blade of claim 1, further comprising a second hole that is spaced apart from the hole, that is configured for receiving a fastener, and that extends through the first side of the base region and the first insert wall.

6. The replacement cleaning blade of claim 5, wherein a portion of the second hole extending through the first insert wall comprises an internal thread.

7. The replacement cleaning blade of claim 1, further comprising a second hole that is configured for receiving a fastener, and that extends through a second side of the base region and the second insert wall.

8. The replacement cleaning blade of claim 7, wherein a portion of the second hole extending through the second insert wall comprises an internal thread.

9. The replacement cleaning blade of claim 7, wherein the second hole position is offset from the hole position along a length of the replacement cleaning blade.

10. The replacement cleaning blade of claim 1, wherein the replacement cleaning blade is capable of tightened installation onto a first mounting frame projection having a thickness of about 0.375 inch and a second mounting frame projection having a thickness of about 0.5 inch.

11. The replacement cleaning blade of claim 1, wherein the replacement cleaning blade is capable of tightened installation onto a first mounting frame projection having a thickness of about 0.5 inch and a second mounting frame projection having a thickness of about 0.75 inch.

12. The replacement cleaning blade of claim 1, wherein the replacement cleaning blade is capable of tightened installation onto a mounting frame projection with a gap between the insert channel and the mounting frame projection that is from about 0.1 inch to about 0.5 inch wide.

13. The replacement cleaning blade of claim 1, further comprising a fastener comprising a screw including a drive head and a shank comprising a threaded region within about 0.25 inch of the drive head.

14. The replacement cleaning blade of claim 1, wherein the second insert wall comprises a solid wall portion opposite the hole in the first insert wall.

15. A belt cleaning system, comprising:
a mounting frame comprising a projection;
a replacement cleaning blade according to claim 1 installed onto the projection.

16. The belt cleaning system of claim 15, wherein the mounting frame projection is devoid of through-holes.

17. The belt cleaning system of claim 15, wherein the mounting frame projection comprises a plurality of through-holes.

18. The belt cleaning system of claim 17, wherein the replacement cleaning blade fastener is offset from the plurality of through-holes.

19. The replacement cleaning blade of claim 1, wherein the replacement cleaning blade is capable of secure installation onto a belt cleaning mounting frame projection with a fastener that extends through only one of the first insert wall and the second insert wall.

20. A replacement cleaning blade for installation onto a belt cleaning mounting frame comprising a projection, the replacement cleaning blade comprising:
a blade body comprising a base region and a distal cleaning edge, the base region comprising a channel for engaging a mounting frame projection;
positioned on at least one side of the channel there is a layer of urethane material and an adjacent layer of metal; and
a hole configured for receiving a fastener and extending through the layer of urethane material and the layer of metal;
wherein a portion of the hole extending through the layer of metal comprises an internal thread; and
wherein the replacement cleaning blade is capable of installation onto at least two different configured mounting frames, the configuration difference comprising at least one of:
number of through-holes disposed in the mounting frame projection;
position of through-holes disposed in the mounting frame projection; and
thickness of the mounting frame projection that engages the channel.

21. The replacement cleaning blade of claim 20, wherein the layer of urethane material is proximate to the channel.

22. The replacement cleaning blade of claim 20, wherein the layer of material is proximate to the channel.

23. The replacement cleaning blade of claim 20, further comprising a fastener disposed in the hole, and wherein the fastener comprises a set screw.

24. A replacement cleaning blade for installation onto a belt cleaning mounting frame comprising a projection, the replacement cleaning blade comprising:
a blade body comprising a base region and a distal cleaning edge;
an insert disposed within the base region, the insert comprising a first insert wall and a spaced apart second insert wall defining a channel therebetween for engaging a mounting frame projection; and
a fastener extending through the first insert wall and configured to press against a first side of a mounting frame projection to affix the replacement cleaning blade to the mounting frame projection;
wherein the second insert wall presses against a second side of the mounting frame projection so that there is no need for a fastener to extend through the second insert wall to affix the replacement cleaning blade to the mounting frame projection.

25. The replacement cleaning blade of claim 24, wherein the replacement cleaning blade is capable of installation onto a mounting frame projection regardless of its through-hole pattern or whether it comprises any through-holes at all.

26. A replacement cleaning blade for installation onto a belt cleaning mounting frame comprising a projection, the replacement cleaning blade comprising:
a blade body comprising a base region and a distal cleaning edge;
an insert disposed within the base region, the insert comprising a first insert wall and a spaced apart second insert wall defining a channel therebetween for engaging a mounting frame projection; and
a hole configured for receiving a fastener and extending through a first side of the base region and the first insert wall;
wherein a portion of the hole extending through the first insert wall comprises an internal thread; and
wherein the replacement cleaning blade is capable of secure installation onto a belt cleaning mounting frame projection with a fastener that extends through the hole, and presses against one side of a mounting frame projection.

* * * * *